(12) United States Patent
Egi

(10) Patent No.: US 10,366,018 B2
(45) Date of Patent: Jul. 30, 2019

(54) CONTROL APPARATUS WITH ACCESS MONITORING UNIT CONFIGURED TO REQUEST INTERRUPT PROCESS

(71) Applicant: OKUMA Corporation, Niwa-gun, Aichi (JP)

(72) Inventor: Yoshimasa Egi, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 15/784,464

(22) Filed: Oct. 16, 2017

(65) Prior Publication Data

US 2018/0107615 A1    Apr. 19, 2018

(30) Foreign Application Priority Data

Oct. 17, 2016   (JP) ................. 2016-203657

(51) Int. Cl.
*G06F 13/16* (2006.01)
*G06F 13/28* (2006.01)
*G06F 13/12* (2006.01)

(52) U.S. Cl.
CPC ........ *G06F 13/1668* (2013.01); *G06F 13/124* (2013.01); *G06F 13/28* (2013.01); *G06F 2213/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,684,948 A | * | 11/1997 | Johnson ................ | G06F 9/3863 710/260 |
| 2005/0240701 A1 | * | 10/2005 | Kuboshima ............ | G06F 13/24 710/260 |
| 2014/0359184 A1 | * | 12/2014 | Kang .................... | G06F 9/4812 710/263 |
| 2015/0220464 A1 | * | 8/2015 | Heisswolf ............. | G06F 21/52 710/267 |

FOREIGN PATENT DOCUMENTS

| | | |
|---|---|---|
| JP | 2000076135 A | 3/2000 |
| JP | 2013148999 A | 8/2013 |

* cited by examiner

*Primary Examiner* — Raymond N Phan
(74) *Attorney, Agent, or Firm* — Cantor Colburn LLP

(57) ABSTRACT

In a control apparatus which uses a CPU which does not have hardware for memory protection, a function is realized to detect unauthorized writing from a non-safety-related unit program in units of bits, for a safety-related unit data area of a RAM, a safety-related unit register area of an external integrated circuit, and a built-in peripheral I/O register of the CPU. A memory access monitoring unit requests an interrupt process upon detection of a write access of the safety-related unit program permitted to access a safety-related unit region. The interrupt process realizes a function to detect write access from a non-safety-related unit program area by using a program counter of a write access origin retracted to a stack area to judge whether the write access origin is a safety-related unit program or the non-safety-related unit program area, and judge, in units of bits, whether or not there is a change to a safety-related unit region.

2 Claims, 3 Drawing Sheets

CONTROL APPARATUS WITH ACCESS MONITORING UNIT CONFIGURED TO REQUEST INTERRUPT PROCESS

CROSS REFERENCE TO RELATED APPLICATION

The present invention claims priority under 35 U.S.C. § 119 to Japanese Patent Application No. 2016-203657 filed on Oct. 17, 2016, the entire content of which is incorporated herein by reference.

TECHNICAL FIELD

The present disclosure relates to a control apparatus having a safety-related unit designed in accordance with a functional safety standard. In particular, the present disclosure relates to a control apparatus having a non-safety-related unit writing detection function, equipped with a function in which unexpected writing, to a RAM or a control register used by a safety-related unit program executed on a CPU in the safety-related unit, from a non-safety-related unit program executed on the same CPU, is detected in units of bits, and the system transitions to a safe state.

BACKGROUND

International standards related to functional safety, such as the IEC 61508 series or the like, require that a system is designed such that a safety-related unit which executes a safety function is not affected by failure of a non-safety-related unit which executes a normal function, or by design errors.

IEC 61508-3:2010 defines that, when software executes safety functions having different levels of safety, it must be proven either that independency is achieved in both time space regions, or that invasion of the independency is controlled. An attachment to the standard shows examples of methods for achieving non-interference between software elements on the same computer. Because of this, in general, in a control apparatus having a safety-related unit, a higher privilege level is assigned to safety-related software so that only the safety-related software can access and write in a RAM or a safety-related register which stores safety-related variables, and a memory administration unit or a memory protection unit specifies, for each privilege level, a space in which write access is allowed. Meanwhile, most types of installation-usage CPUs of recent years do not have the memory administration unit or the memory protection unit. Thus, the protection method using the privilege mode cannot be easily utilized.

JP 2013-148999 A ("Patent Document 1") discloses a method of providing a function to prevent write access from a non-safety-related unit on a safety-related unit register in an external integrated circuit, even for a control apparatus which uses a CPU which does not have a privilege mode for system protection.

Further, JP 2000-76135 A ("Patent Document 2") discloses a method of preventing execution of an unintended memory access instruction, by adding small-size hardware which judges a program counter and an access destination memory address, during decoding of the memory access instruction, in a CPU which does not have the privilege mode.

However, the protection method of Patent Document 2 cannot be used in a CPU which does not have the hardware which judges both the program counter and the access destination memory address during instruction decoding by the CPU.

On the other hand, for example, for an internal register of the CPU, there is a demand for preventing write access from the non-safety-related unit, in units of bits. However, with the privilege mode which designates an access region in units of addresses, the protection method of Patent Document 2, and the protection method of Patent Document 1 in which the safety-related unit register and the non-safety-related unit register are separated by an external integrated circuit and the safety-related unit register is then protected, the protection in units of bits cannot be executed. Because of this, for example, when both a safety-related I/O terminal and a non-safety-related I/O terminal exist as I/O terminals of the CPU, it is necessary to apply a particular measure such as, for example, designing CPU peripheral circuits so that the terminals can be set independently in different registers, or executing an output process for the non-safety-related I/O terminal with safety-related firmware. In the related art, such restriction on the design occurs in the hardware and the firmware.

An advantage of the present disclosure lies in provision, in a control apparatus having a safety-related unit designed in accordance with a functional safety standard, of a non-safety-related unit write detection function, equipped with a function in which the system transitions to a safe state even when there is an unexpected write to a RAM or a control register used by a safety-related unit program executed on a CPU in a safety-related unit, or an arbitrary bit in the RAM or the control register, by a non-safety-related unit program executed on the same CPU, using a CPU which does not have hardware for memory protection.

SUMMARY

In a functional safety standard, it is sufficient for the system to be able to transition to a safe state when an abnormality of the system is detected. Thus, it is not necessary to prevent changing of the memory or the register by an unauthorized access, and it is sufficient that a function is provided to detect the unauthorized access and transition the system to the safe state. On the other hand, some installation-usage CPUs have an access monitoring unit which monitors a state of an address bus, which judges, for an access to an arbitrary address, whether or not at least an address range and the type of read/write match preset values, and which requests an interrupt process to the CPU. For example, for the purpose of program debugging which does not use an in-circuit emulator, there exist commercially available, installation-usage CPUs having the access monitoring unit. When a CPU having the access monitoring unit is used, an interrupt process occurs for write access to the RAM or the control register used by the safety-related unit program. An address range of a ROM region storing the safety-related unit program and an address range of a ROM region storing the non-safety-related unit program are separated. An interrupt process uses a program counter retracted to a stack area, to judge whether the write access is by the safety-related unit program or by the non-safety-related unit. For the write access by the non-safety-related unit, the interrupt process compares with backup data to judge whether or not there is a data change for the bit used by the safety-related unit. The backup data is set during write access by the safety-related unit, or during initialization.

In the present disclosure, an interrupt process is generated for write access to an arbitrary bit of a RAM or a control register used by the safety-related unit program. In the interrupt process, it is judged, based on a program counter retracted to a stack, whether the origin of the write access is a safety-related unit program or a non-safety-related unit program. In the case of the write access by the non-safety-related program, in the interrupt process, the data is compared with the backup data, and it is judged whether or not there is a data change in a safety-related bit. When there is a change in the safety-related bit, in the interrupt process, an error process is executed and the system transitions to a safe state.

BRIEF DESCRIPTION OF DRAWINGS

Embodiment(s) of the present disclosure will be described based on the following figures, wherein.

DESCRIPTION OF EMBODIMENTS

Figure 1:
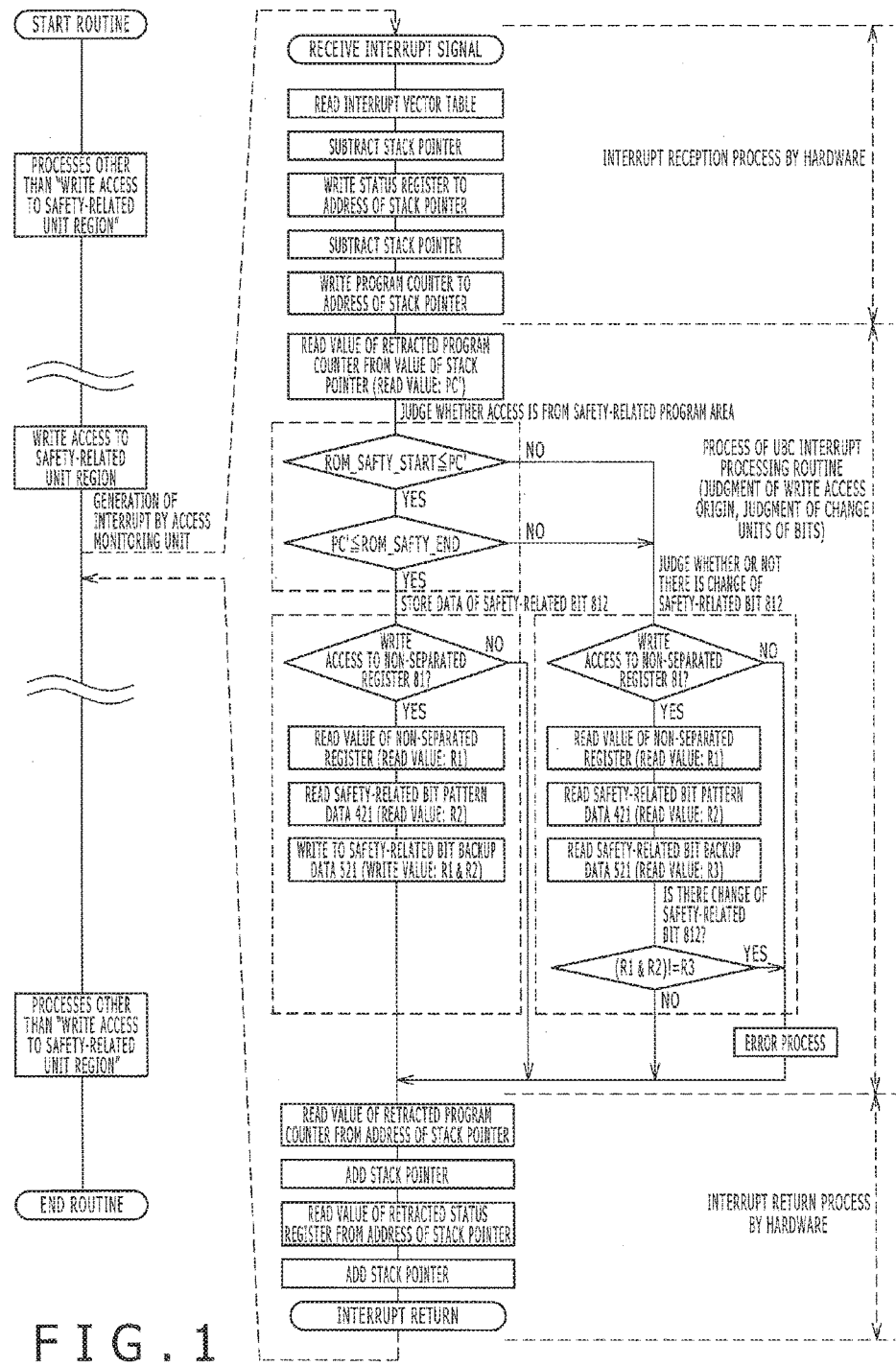
FIG. 1 is a diagram showing an example CPU process algorithm in an embodiment of the present disclosure.

An embodiment of the present disclosure will now be described for a control apparatus having a function to detect writing by a non-safety-related unit. First, an embodiment in which write detection is executed in units of bits for a built-in peripheral I/O register 8 of a CPU will be described with reference to a block diagram of FIG. 2 and a flowchart of FIG. 1. As a data area related to a safety function, a safety-related unit data area 52 is provided in a built-in RAM 5. In addition, as a control register related to the safety function, a safety-related unit register area 72 is provided in an external integrated circuit 7. Further, in the built-in peripheral I/O register 8 which sets the operation of the CPU 1, a non-separated register 81 which is used by both the safety function and a non-safety function is provided. The non-separated register 81 includes a safety-related bit 812 related to the safety function and a non-safety-related bit 811 which is not related to the safety function. In FIG. 2, as the non-separated register 81, a case is exemplified which uses a register which sets an output of the I/O port 9. In the I/O port 9, output levels of a safety output terminal 92 related to the safety function and a non-safety output terminal 91 which is not related to the safety function vary respectively by settings of the safety-related bit 812 and the non-safety-related bit 811. It is necessary to prevent a non-safety-related processing routine operated on the CPU from erroneously write-accesses these memories, registers, and particular bits in the registers related to the safety function, more specifically, the safety-related unit data area 52, the safety-related unit register area 72, and the non-separated register area 81 (hereinafter referred to as "safety-related unit region"). In the present embodiment, the "safety-related processing routine" refers to a particular program which is designed for safety, and is a routine which is permitted to access the safety-related unit region. On the other hand, a "non-safety-related processing routine" refers to a program other than the safety-related processing routine, and is a routine which is not permitted to access the safety-related unit region.

FIG. 2 is a block diagram related to memory access of a microcomputer equipped with a memory access monitoring unit 10. A CPU core 2 reads a program from a built-in ROM 4 through an internal bus 3, and executes processes such as a calculation process, an access process to the built-in RAM 5, an access process to the external integrated circuit 7, and an access process to the built-in peripheral I/O register 8. The accesses to the built-in RAM 5 and the built-in peripheral I/O register 8 are executed through the internal bus 3, and the access to the external integrated circuit 7 is executed through the internal bus 3 and a BSC (bus state controller) 6. The memory access monitoring unit 10 monitors a bus cycle of the internal bus 3, and can issue, through an INTC (interrupt controller) 11, an interrupt signal to the CPU core 2 in response to a read/write access or the like to a particular address.

Figure 3:
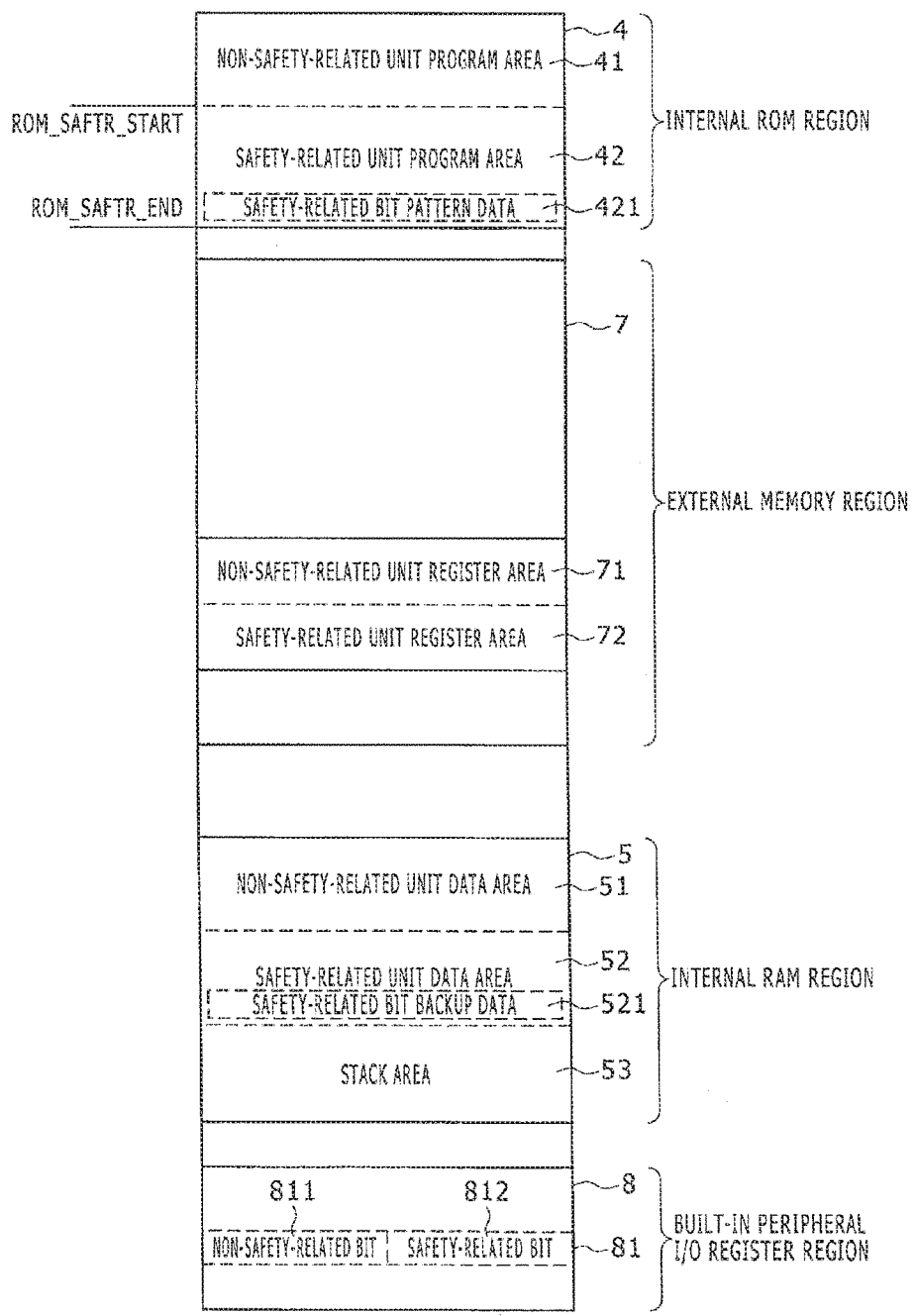
FIG. 3 is a diagram showing an example address map in an embodiment of the present disclosure.

FIG. 3 is a diagram showing an example address map in the present embodiment. An address assignment range of the built-in ROM 4 (built-in ROM region), an address assignment range of the built-in RAM 5 (built-in RAM region), an address assignment range of the external integrated circuit 7 (external memory region), and an address assignment range of the built-in peripheral I/O register 8 (built-in peripheral I/O region) are determined by the type of the CPU. The address assignment range of the built-in ROM 4 includes a non-safety-related unit program area 41 in which the non-safety-related processing routine is stored, and a safety-related unit program area 42 in which the safety-related processing routine is stored. The addresses thereof are respectively designated during compiling, so that each of the address ranges is a consecutive address range. The address assignment range of the built-in RAM 5 includes a non-safety-related unit data area 51 in which data of the non-safety-related function is stored, a safety-related unit data area 52 in which data of the safety-related function is stored, and a stack area 53. The addresses thereof are respectively designated during compiling, so that each of the address ranges is a consecutive address range. The address assignment range of the external integrated circuit 7 includes a non-safety-related unit register area 71 in which a register of the non-safety-related function is stored, and a safety-related unit register area 72 in which a register of the safety-related function is stored. The external integrated circuit 7 is designed so that each of the address ranges is a consecutive address range. In the built-in peripheral I/O register 8, a bit pattern of 1 is set in advance for the safety-related bit 812 in the non-separated register 81, and a bit pattern of 0 is set in advance for the non-safety-related bit 811 in the non-separated register 81. These bit patterns are stored as safety-related bit pattern data 421 in the safety-related unit program area 42. FIG. 3 shows the non-safety-related bit 811 and the safety-related bit 812 as consecutive bits, but alternatively, the non-safety-related bit 811 and the safety-related bit 812 may be non-consecutive within the register. The data of the safety-related bit which is set by the program of the safety-related unit is stored as safety-related bit backup data 521 in the safety-related unit data area 52.

Figure 2:
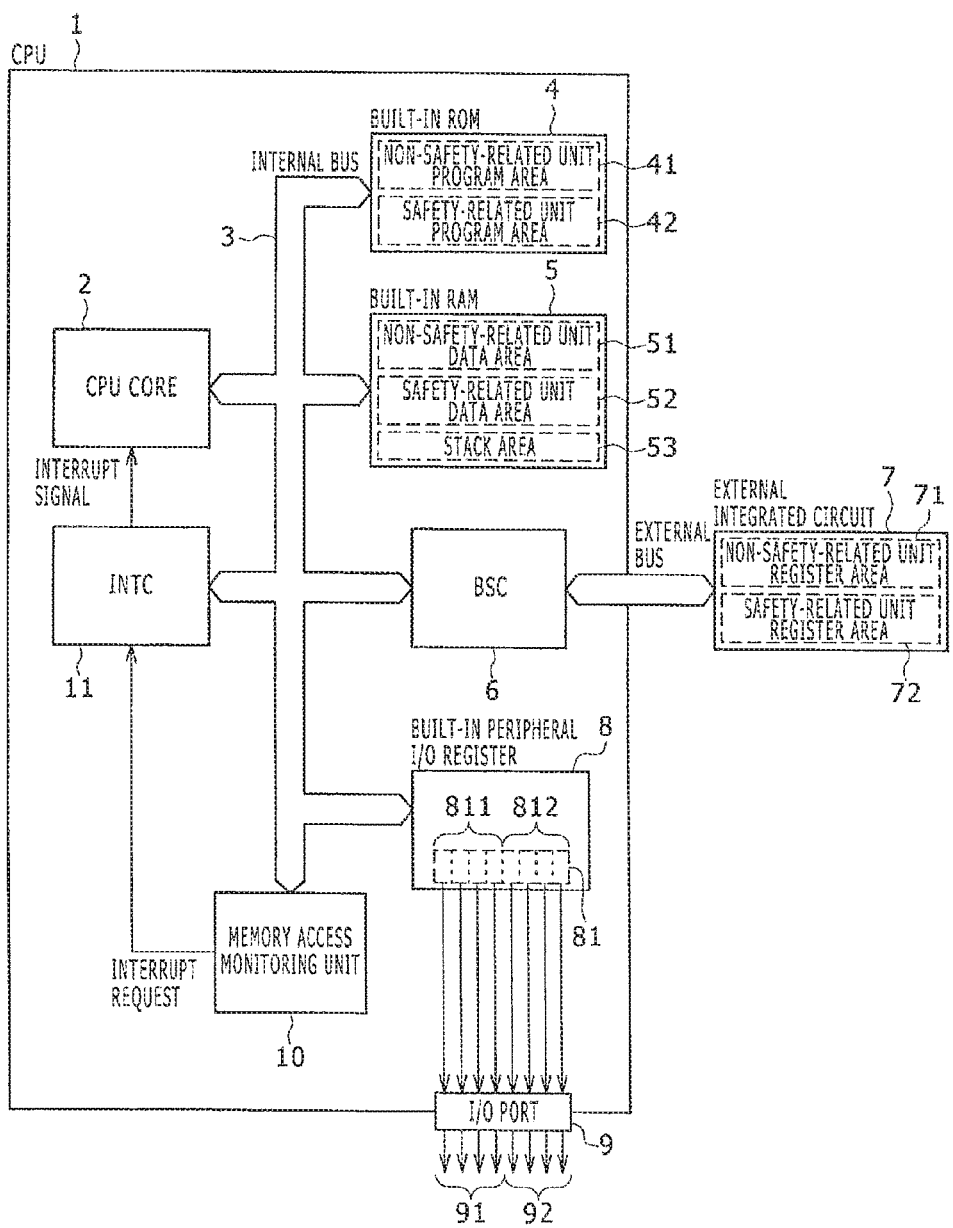
FIG. 2 is a diagram showing an example CPU structure in an embodiment of the present disclosure.

FIG. 1 is a flowchart showing execution content of the detection process of writing to the safety-related unit data area 52 and the operations of each unit in FIG. 1 in the present embodiment. In the flowchart of FIG. 1, a routine on the left side is a non-safety-related unit processing routine or a safety-related unit processing routine, and, for example, a processing routine having the highest priority is executed by an interrupt process. When the processing routine write-accesses the safety-related unit region, the memory access monitoring unit 10 detects the write access, and outputs an interrupt signal through the INTC 11 to the CPU core 2.

When the CPU core 2 receives the interrupt signal, the CPU core 2 executes retraction of the status register and the program counter to the stack area 53 by a hardware process, and then executes an interrupt processing routine. In the interrupt processing routine, a program counter which is retracted to the stack area 53 is read, and it is judged whether or not the program counter retracted to the stack region is included in the address range of the safety-related unit data area 52. When the program counter is not included in the address range, the interrupt processing routine judges that the access is a write access from the non-safety-related unit data area 51. On the other hand, when the program counter is included in the address range, the interrupt processing routine judges that the access is a write access from the safety-related unit data area 52.

In the case of the write access from the safety-related unit data area 52, for the write access to the non-separated register 81, a logical product of the non-separated register 81 and the safety-related bit pattern data 421 is determined, and is stored in the safety-related bit backup data 521. In the event that the value of the safety-related bit 812 of the non-separated register 81 is not changed after the initial setting, the present step may be omitted.

In the case of the write access from the non-safety-related unit data area 51, if the write access is to the safety-related unit data area 52 or the safety-related unit register area 72, an error process is executed. For the write access to the non-separated register 81, it is judged whether or not the logical product between the non-separated register 81 and the safety-related bit pattern data 421 matches the safety-related bit backup data 521, and, when the values do not match, a change in the safety-related bit 812 is judged, and an error process is executed.

The detection process of writing to the safety-related unit region by the interrupt is executed for all write accesses to the safety-related unit region, regardless of whether the access is a write access from the non-safety-related processing routine or a write access from the safety-related processing routine. With the writing detection process, a process time is increased, but because normally, in the non-safety-related processing routine, only the write access to the non-separated register 81 is executed and the write access frequency to the non-separated register is low, the increase in the process time does not cause a problem. Moreover, in the safety-related processing routine, normally the routine is executed with a low priority level, and thus the increase in the process time by the writing detection process does not cause a problem.

As described, by executing the write detection process of the flowchart of FIG. 1 using the CPU shown in FIG. 2, it becomes possible to realize a function in which unexpected writing of the RAM or the register used by a safety-related program, or a particular bit of the RAM and the register, is detected, and the system transitions to a safe state.

REFERENCE SIGNS LIST

1 CPU; 2 CPU CORE; 3 INTERNAL BUS; 4 BUILT-IN ROM; 5 BUILT-IN RAM; 6 BSC (BUS STATE CONTROLLER); 7 EXTERNAL INTEGRATED CIRCUIT; 8 BUILT-IN PERIPHERAL I/O REGISTER; 9 I/O PORT; 10 MEMORY ACCESS MONITORING UNIT; 11 INTC (INTERRUPT CONTROLLER); 41 NON-SAFETY-RELATED UNIT PROGRAM AREA; 42 SAFETY-RELATED UNIT PROGRAM AREA; 51 NON-SAFETY-RELATED UNIT DATA AREA; 52 SAFETY-RELATED UNIT DATA AREA; 53 STACK AREA; 71 NON-SAFETY-RELATED UNIT REGISTER AREA; 72 SAFETY-RELATED UNIT REGISTER AREA; 71 NON-SEPARATED REGISTER; 91 NON-SAFETY OUTPUT TERMINAL; 92 SAFETY OUTPUT TERMINAL; 421 SAFETY-RELATED BIT PATTERN DATA; 521 SAFETY-RELATED BIT BACKUP DATA; 811 NON-SAFETY-RELATED BIT; 812 SAFETY-RELATED BIT.

The invention claimed is:

1. A control apparatus comprising:
a CPU;
an access monitoring unit configured to, in response to at least an address range and a type of read/write access to an arbitrary address matching preset values, request an interrupt process to the CPU wherein
the access monitoring unit is configured to request the interrupt process upon detection of a write access to a safety-related unit region including at least one of: a safety-related unit data area of a RAM, a safety-related unit register area of an external integrated circuit, and a built-in peripheral I/O register of the CPU, which is used by a safety-related unit program, and
the CPU is configured such that the interrupt process detects the write access to the safety-related unit region by a non-safety related unit program by using a program counter of a write access origin which is retracted to a stack area to judge whether the write access to the safety-related unit region is a write access by the safety-related unit program or a write access by the non-safety-related unit program, and judges, in units of bits, whether or not there is a change with respect to the safety-related unit region.

2. The control apparatus according to claim 1, wherein the control apparatus is configured such that, when the write access to the safety-related unit region is the write access from the safety-related unit program, a logical product, between a non-separated register which is included in the built-in peripheral I/O register and used by both the safety-related unit program and the non-safety-related unit program, and safety-related bit pattern data showing a region used by the safety-related unit program in the non-separated register, is stored as backup data, and
the control apparatus is configured such that, when the write access to the safety-related unit region is the write access from the non-safety related unit program, and if the logical product between the non-separated register and the safety-related bit pattern data does not match the backup data, an error process is executed.

* * * * *